US012786899B2

(12) United States Patent
Huang et al.

(10) Patent No.: US 12,786,899 B2
(45) Date of Patent: Nov. 3, 2026

(54) COMMUNICATION METHOD AND APPARATUS

(71) Applicant: HUAWEI TECHNOLOGIES CO., LTD., Shenzhen (CN)

(72) Inventors: Lin Huang, Shanghai (CN); Tao Jin, Shanghai (CN); Chunlin Xue, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 18/633,757

(22) Filed: Apr. 12, 2024

(65) Prior Publication Data

US 2024/0259961 A1 Aug. 1, 2024

Related U.S. Application Data

(63) Continuation of application No. PCT/CN2022/121393, filed on Sep. 26, 2022.

(30) Foreign Application Priority Data

Oct. 15, 2021 (CN) ......................... 202111201482.3

(51) Int. Cl.
*H04W 52/42* (2009.01)
*H04W 52/34* (2009.01)
*H04W 52/36* (2009.01)

(52) U.S. Cl.
CPC ......... *H04W 52/42* (2013.01); *H04W 52/343* (2013.01); *H04W 52/36* (2013.01)

(58) Field of Classification Search
None
See application file for complete search history.

(56) References Cited

U.S. PATENT DOCUMENTS

| | | | | |
|---|---|---|---|---|
| 11,064,443 | B1 | 7/2021 | Lin et al. | |
| 2004/0192325 | A1* | 9/2004 | Backes | H04W 52/343 455/450 |
| 2011/0275405 | A1* | 11/2011 | Backman | H04W 52/34 455/522 |
| 2023/0128635 | A1* | 4/2023 | El-Keyi | H04W 52/42 370/318 |

FOREIGN PATENT DOCUMENTS

| | | | | |
|---|---|---|---|---|
| EP | 3300436 | A1 * | 3/2018 | H04W 52/367 |
| WO | WO-2009002241 | A1 * | 12/2008 | H04W 36/22 |

* cited by examiner

*Primary Examiner* — Faruk Hamza
*Assistant Examiner* — Cassandra L Decker
(74) *Attorney, Agent, or Firm* — Rimon PC

(57) ABSTRACT

This application provides a communication method and related apparatus. In the communication method, a network device determines a first normalized power at a start moment of an $n^{th}$ period in N periods, and determines a total normalized power expected to be used by a plurality of cells in the $n^{th}$ period. When the total normalized power is greater than the first normalized power, the network device allocates power to each cell based on a preset normalized power of each cell and the first normalized power. This resolves a problem that when a cell power quota at each frequency for a multi-frequency cell is limited, the coverage and network performance of each cell is affected.

20 Claims, 6 Drawing Sheets

COMMUNICATION METHOD AND APPARATUS

CROSS-REFERENCE TO RELATED APPLICATIONS

This application is a continuation of International Application No. PCT/CN2022/121393, filed on Sep. 26, 2022, which claims priority to Chinese Patent Application No. 202111201482.3, filed on Oct. 15, 2021. The disclosures of the aforementioned applications are incorporated herein by reference in these entireties.

TECHNICAL FIELD

This application relates to the field of communication technologies, and in particular, to a communication method and an apparatus.

BACKGROUND

Hazards of non-ionizing radiation (NIR) in an electromagnetic field (EMF) to organisms are mainly reflected in a thermal effect, a non-thermal effect, and a cumulative effect. The international commission on non-ionizing radiation protection (ICNIRP) has specified different power density limits for different frequencies for protection against the NIR.

Due to the power density limits imposed by the ICNIRP, the protection against the NIR by the ICNIRP presents difficulties in a process of mobile network deployment. For example, when deploying a multi-frequency site, a cell power quota at each frequency is reduced as the quantity of frequencies increases. The diminished cell power quota affects network coverage and network performance of each cell.

SUMMARY

This application provides a communication method and an apparatus, to resolve a problem that a cell power quota at each frequency for a multi-frequency cell is limited, affecting coverage and network performance of each cell.

According to a first aspect, this application provides a communication method. The method may include: a network device determines a first normalized power at a start moment of an $n^{th}$ time period or period of N time periods or periods, and determines a total normalized power expected to be used by a plurality of cells in the $n^{th}$ period. Then, when the total normalized power is greater than the first normalized power, the network device allocates power to each cell based on preset normalized power of each cell in the plurality of cells and the first normalized power. The preset normalized power is used for the power allocation, N is an integer greater than or equal to 1, and n is an integer greater than or equal to 1 and less than or equal to N.

According to the foregoing method, a cell power allocation constraint can be broken, power sharing between cells on a plurality of bands can be achieved, and cell network performance can be improved while an EMF regulatory requirement of the network device can still be met.

In a possible implementation, when the total normalized power is less than or equal to the first normalized power, the network device allocates power to each cell based on a service requirement of each cell in the plurality of cells in the $n^{th}$ period. This can meet a power requirement of each cell.

In a possible implementation, the plurality of cells operate on different bands.

In a possible implementation, the preset normalized power of each cell in the plurality of cells may satisfy the following formula:

$$\text{Preset normalized power of a cell } i = \frac{P_{config}(i) * G(i)}{S_L(i)}$$

i is an index of any one of the plurality of cells, and i is an integer greater than or equal to 1; $P_{config}(i)$ is an average power threshold that is of the cell i and that is configured for meeting a total power density requirement of a co-coverage cell; G(i) is an antenna gain of the cell i; and $S_L(i)$ is a power density threshold of the cell i.

In a possible implementation, a method for the network device to determine the first normalized power at the start moment of the $n^{th}$ period may be: the network device subtracts, from an initial normalized power amount, products of the plurality of cells to obtain a difference, where each of the products is obtained by multiplying a sum of actual transmit power of each cell in the first n−1 periods by a first coefficient of each cell. The network device determines that the obtained difference is the first normalized power. The initial normalized power amount is a sum of the preset normalized power of the plurality of cells in the N periods, and the first coefficient of each cell is a ratio of an antenna gain of each cell to a power density threshold of each cell. In this way, the network device can accurately determine the first normalized power at the start moment of the $n^{th}$ period, to allocate power of the $n^{th}$ period to the plurality of cells based on the first normalized power.

In a possible implementation, the initial normalized power amount may satisfy the following formula:

$$\text{Initial normalized power amount} = \sum_i \frac{P_{config}(i) * G(i)}{S_L(i)} * N$$

i is the index of any one of the plurality of cells, and i is an integer greater than or equal to 1; $P_{config}(i)$ is the average power threshold that is of the cell i and that is configured for meeting the total power density requirement of the co-coverage cell; G(i) is the antenna gain of the cell i; and $S_L(i)$ is the power density threshold of the cell i.

According to the foregoing method, the initial normalized power amount can be accurately determined.

In a possible implementation, a method for the network device to determine the total normalized power expected to be used by the plurality of cells in the $n^{th}$ period may be: the network device multiplies a preset maximum power of each cell of the $n^{th}$ period by the first coefficient to obtain a normalized power expected to be used by each cell in the $n^{th}$ period. The network device determines that a sum of normalized power expected to be used by all cells in the $n^{th}$ period is the total normalized power. The first coefficient is the ratio of the antenna gain of each cell to the power density threshold of each cell. In this way, the network device may determine the total normalized power of the plurality of cells in the $n^{th}$ period, to subsequently allocate power of the $n^{th}$ period to the plurality of cells with reference to the first normalized power at the start moment of the $n^{th}$ period.

In a possible implementation, a method for the network device to allocate the power to each cell based on the preset normalized power of each cell in the plurality of cells and the first normalized power may be: the network device divides the preset normalized power of each cell by the sum of the preset normalized power of all the cells, to obtain a power proportion of each cell. The network device multiplies the first normalized power, the power proportion of each cell, and a reciprocal of the first coefficient, to obtain the power allocated to each cell. The first coefficient is the ratio of the antenna gain of each cell to the power density threshold of each cell. In this way, the network device can accurately allocate power to each cell.

In a possible implementation, the network device determines a load difference between a first cell and a second cell in m periods before the $n^{th}$ period. When the load difference is greater than or equal to a load difference threshold, and a load of the first cell is greater than a load of the second cell, the network device hands over, in the $n^{th}$ period, at least one to-be-scheduled terminal device in the first cell to the second cell. The m periods include an (n−1)th period, and m is an integer greater than or equal to 1. This can improve the network performance.

In a possible implementation, the network device determines a normalized power utilization difference between the first cell and the second cell in the m periods before the $n^{th}$ period. When the normalized power utilization difference is greater than or equal to a normalized power utilization difference threshold, and the normalized power utilization of the first cell is greater than the normalized power utilization of the second cell, the network device hands over, in the $n^{th}$ period, at least one to-be-scheduled terminal device in the first cell to the second cell. The normalized power utilization of the first cell is a value obtained by dividing a product of the actual transmit power of the first cell in the m periods and a first coefficient of the first cell by the initial normalized power amount, and the normalized power utilization of the second cell is a value obtained by dividing a product of actual transmit power of the second cell in the m periods and a first coefficient of the second cell by the initial normalized power amount. The initial normalized power amount is the sum of the preset normalized power of the plurality of cells in the N periods. The first coefficient of the first cell is a ratio of an antenna gain of the first cell to a power density threshold of the first cell, and the first coefficient of the second cell is a ratio of an antenna gain of the second cell to a power density threshold of the second cell. The m periods include an (n−1)th period, and m is an integer greater than or equal to 1. This can improve the network performance.

According to a second aspect, this application further provides a communication apparatus, and the communication apparatus has a function of implementing the network device in the foregoing first aspect or the possible implementations of the first aspect. The function may be implemented by hardware, or may be implemented by hardware executing corresponding software. The hardware or the software includes one or more modules corresponding to the function.

In a possible implementation, a structure of the communication apparatus includes a storage unit and a processing unit. These units may perform corresponding functions of the network device in the foregoing first aspect or the possible implementations of the first aspect. For details, refer to the detailed descriptions in the method. Details are not described herein.

In a possible implementation, a structure of the communication apparatus includes a memory and a processor, and optionally further includes a transceiver. The transceiver is configured to send and receive information or data, and is configured to communicate and interact with another device in a communication system. The processor is configured to support the communication apparatus in performing a corresponding function of the network device in the foregoing first aspect or the possible implementations of the first aspect. The memory is coupled to the processor, and stores program instructions and data that are necessary for the communication apparatus.

According to a third aspect, an embodiment of this application provides a communication system that includes the foregoing network device and the like.

According to a fourth aspect, an embodiment of this application provides a computer-readable storage medium. The computer-readable storage medium may be transitory or non-transitory stores program instructions, and when the program instructions are run on a computer, the computer is enabled to perform the method according to any one of the first aspect and the possible implementations of the first aspect in embodiments of this application. For example, the computer-readable storage medium may be any usable medium accessible to the computer. The following provides an example but does not impose a limitation. The computer-readable medium may include a non-transient computer-readable medium, a random access memory (RAM), a read-only memory (ROM), an electrically erasable programmable read-only memory (EEPROM), a CD-ROM or another type of optical disc storage, a magnetic disk storage medium or another type of magnetic storage device, or any other medium that can be used to carry or store expected program code in a form of instructions or a data structure and can be accessed by the computer.

According to a fifth aspect, an embodiment of this application provides a computer program product including computer program code or instructions. When the computer program product runs on a computer, the computer is enabled to implement the method according to any one of the foregoing first aspect or the possible implementations of the first aspect.

According to a sixth aspect, this application further provides a chip. The chip is coupled to a memory, and is configured to read and execute program instructions stored in the memory, to implement the method according to any one of the first aspect or the possible implementations of the first aspect.

For each of the second aspect to the sixth aspect and technical effects that may be achieved by each of the aspects, refer to descriptions of technical effects that may be achieved in the first aspect or possible solutions in the first aspect. Details are not described herein again.

DESCRIPTION OF EMBODIMENTS

The following further describes in detail this application with reference to the accompanying drawings.

Embodiments of this application provide a communication method and an apparatus, to resolve a problem that a cell power quota at each frequency for a multi-frequency cell is limited, affecting coverage and network performance of each cell. Mutual reference may be made to the implementations of the apparatus and the method in this application, and repeated parts are not described.

In the descriptions of this application, terms such as "first" and "second" are only for distinction and description, but cannot be understood as indicating or implying relative importance, or as indicating or implying a sequence.

In the descriptions in this application, "at least one (type)" refers to one or more (types), and "a plurality of (types)" refers to two or more than two (types).

In the descriptions of this application, "/" represents "or". For example, a/b represents a or b.

To describe technical solutions in embodiments of this application more clearly, the following describes, in detail with reference to the accompanying drawings, the communication method and the apparatus provided in embodiments of this application.

The communication method provided in embodiments of this application may be applied to various communication systems. For example, a remote radio unit (RRU) wide-band system. The RRU wide-band system may include but is not limited to systems such as a time division duplex (TDD) system, a frequency division duplexing (FDD) system, a long term evolution (LTE) system, and a new radio (NR) system.

Figure 1:
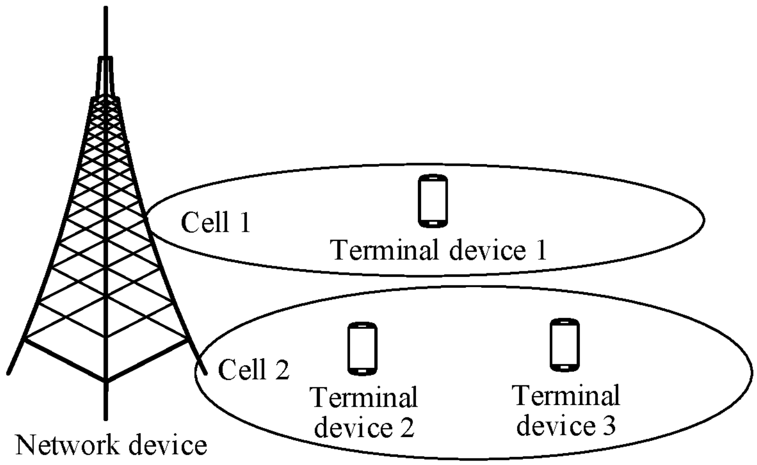
FIG. 1 is a schematic architectural diagram of a communication system according to this application.

For example, FIG. 1 shows a possible architecture of a communication system to which the communication method provided in embodiments of this application is applicable. The communication system includes a network device and a terminal device.

The network device is a device having a wireless transceiver function or a chip that can be disposed in the network device. The network device includes but is not limited to: a base station (gNB), a radio network controller (RNC), a NodeB (NodeB, NB), a base station controller (BSC), a base transceiver station (BTS), a home base station (for example, a home evolved NodeB or a home NodeB), a baseband unit (BBU), an access point (AP) in a wireless fidelity (Wi-Fi) system, a wireless relay node, a wireless backhaul node, a transmission point (TRP or TP), and the like. The network device may alternatively be a network node that forms a gNB or a transmission point, for example, a baseband unit (BBU) or a distributed unit (DU).

A plurality of cells are deployed for the network device, and the plurality of cells may be shown as a cell 1 and a cell 2 in FIG. 1. The plurality of cells operate on different bands. The plurality of cells are co-coverage cells, or may be understood as cells that share a radio frequency module and that is served by the network device. The co-coverage cells refer to cells that have a same coverage angle and whose coverage ranges overlap or include each other. For example, the plurality of cells may all be LTE cells, or may all be NR cells, or may be a plurality of cells in which an LTE cell and an NR cell coexist, or the plurality of cells may further include another type of cell. This is not limited in this application.

Each cell includes at least one terminal device. For example, as shown in FIG. 1, the cell 1 includes terminal device 1, and the cell 2 includes a terminal device 2 and a terminal device 3.

For example, the terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet computer, a computer with a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a smart wearable device (such as smart glasses, a smart watch, or a smart headset), a wireless terminal in a smart home, or the like. The terminal device may alternatively be a chip, a chip module (or a chip system), or the like that can be disposed in the foregoing device. An application scenario is not limited in embodiments of this application. The terminal device having a wireless transceiver function and the chip that can be disposed in the terminal device are collectively referred to as the terminal device in this application.

It should be noted that a quantity of cells corresponding to the network device and a quantity of terminal devices in each cell shown in FIG. 1 are merely examples for description. In an actual implementation, more cells and/or more terminal devices may be included. This is not limited in this application.

At present, hazards of non-ionizing radiation (NIR) in an electromagnetic field (EMF) to organisms are reflected in a thermal effect, a non-thermal effect, and a cumulative effect. To protect human beings from the NIR, the international commission on non-ionizing radiation protection (ICNIRP) has specified different power density limits for electromagnetic waves of different frequencies.

Due to the power density limits, the protection against the NIR designed by the ICNIRP has side effects on mobile network deployment. For example, in a process of deploying a multi-frequency site (that is, a multi-band multi-cell network device), the ICNIRP specifies that an EMF of the multi-band multi-cell network device needs to satisfy the following Formula 1:

$$\sum_i [S(i)/S_L(i)] \leq 1, \quad \text{Formula 1}$$

where

S(i) represents an actual power density of a cell i, and $S_L(i)$ represents a regulatory power density requirement (that is, a power density threshold of the cell i) of a band that the cell i operates on. In other words, a regulation requires that a sum of ratios of actual power density of all co-coverage cells of each network device to regulatory power density requirements corresponding to the cells be less than or equal to 1.

Based on the foregoing constraint, as a quantity of cells that are on each band and that are of the network device increases, a cell power quota on a band in the co-coverage cell is limited. This affects coverage and network performance of each cell.

To address this problem, this application provides a communication method, to improve network performance.

Figure 2:
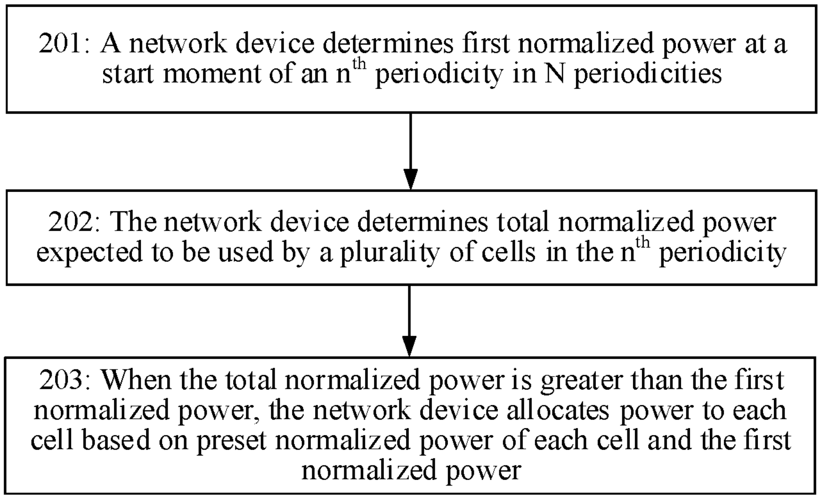
FIG. 2 is a flowchart of a communication method according to this application.

Based on the foregoing descriptions, FIG. 2 shows a communication method according to an embodiment of this application. An example procedure of the method may include the following steps.

Step 201: A network device determines a first normalized power at a start moment of an $n^{th}$ period in N periods. N is an integer greater than or equal to 1, and n is an integer greater than or equal to 1 and less than or equal to N.

In some implementation, the first normalized power is the remaining normalized power in a resource pool in an (n−1)th period.

Figure 3:
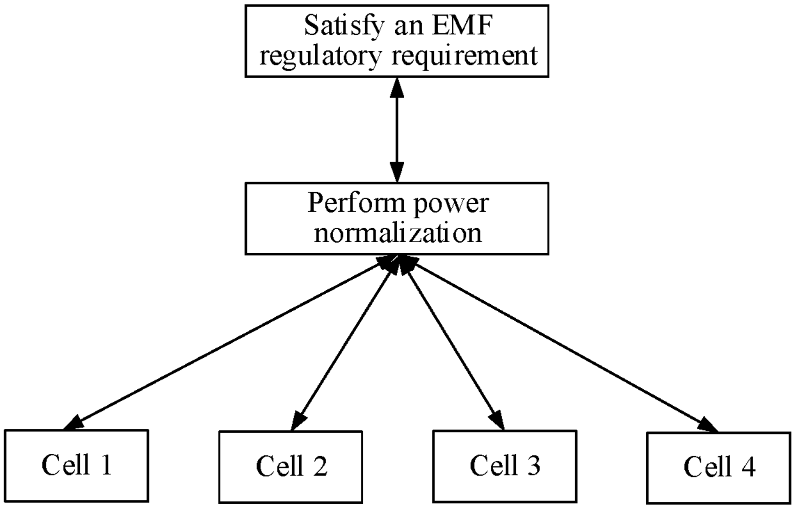
FIG. 3 is a schematic diagram in which cells jointly perform power normalization according to this application.

In some embodiments of this application, based on the constraint of the Formula 1, to ensure that the total radiation generated by a plurality of co-coverage cells of the network device does not exceed an EMF regulatory requirement, the network device may perform power normalization calculation for the plurality of co-coverage cells together. For example, as shown in FIG. 3, the network device jointly controls a cell 1 to a cell 4 in the plurality of co-coverage cells, that is, the power of the cell 1 to the cell 4 may be normalized, to satisfy the EMF regulatory requirement. Details are as follows.

According to the foregoing Formula 1 $\Sigma_i[S(i)/S_L(i)]\leq 1$, the following may be obtained:

$$\sum_i \frac{S(i)}{S_L(i)} \leq \sum_i \frac{S_{config}(i)}{S_L(i)} \leq 1$$

In other words, the following may be obtained:

$$\sum_i \frac{S(i)}{S_L(i)} \leq \sum_i \frac{S_{config}(i)}{S_L(i)}$$

Further, the following may be obtained by expanding the formula:

$$\sum_i \frac{\frac{P(i)*G(i)}{4*\pi*R^2}}{S_L(i)} \leq \sum_i \frac{\frac{P_{config}(i)*G(i)}{4*\pi*R^2}}{S_L(i)}$$

Finally, the following may be obtained:

$$\sum_i \frac{P(i)*G(i)}{S_L(i)} \leq \sum_i \frac{P_{config}(i)*G(i)}{S_L(i)}$$

The foregoing parameters are described as follows.

P(i) is an actual transmit power of a cell i, and is related to a service load of the cell i.

$P_{config}(i)$ is an average power threshold that is of the cell i and that is configured for meeting a total power density requirement of a co-coverage cell.

G(i) is an antenna gain of the cell i, which is related to an antenna model and a frequency of the cell i, and measured in folds.

$S_L(i)$ is a power density threshold of the cell i, is also referred to as a regulatory threshold of the cell i, which is related to the frequency of the cell i and measured in watts per square meter ($W/m^2$).

R is a distance from a radiated position to a radiation source (that is, a network device) and measured in meters (m).

S(i) is an actual power density (that is, an actual radiation quantity) of the cell i and measured in $W/m^2$, where $S(i)=P(i)*G(i)/(4*\pi*R^2)$.

$S_{config}(i)$ is a statically configured power density threshold (that is, a threshold radiation quantity) for the cell i, where $S_{config}(i)=P_{config}(i)*G(i)/(4*\pi*R^2)$. And i is an index of any one of the plurality of cells, where i is an integer greater than or equal to 1.

Based on the foregoing principle, the network device may assign a preset normalized power of the plurality of cells in a period of time (that is, the N periods) into the resource pool, determine the remaining normalized power of the resource pool in real time, and determine, based on the remaining normalized power, how to allocate power to the plurality of cells. This can implement power sharing of the plurality of cells and satisfy a specified EMF power constraint.

The preset normalized power of each cell is a product of an average power threshold $P_{config}(i)$ of each cell and a first coefficient of each cell, where the first coefficient is a ratio of the antenna gain G(i) of each cell to the power density threshold $S_L(i)$ of each cell, the power density threshold of each cell is related to a band of each cell, and the average power threshold of each cell is configured for meeting the total power density requirement of the co-coverage cell.

For example, the preset normalized power of each cell may satisfy the following Formula 2:

Preset normalized power of a cell $$i = \frac{P_{config}(i)*G(i)}{S_L(i)}, \quad \text{Formula 2}$$

where the first coefficient is $$\frac{G(i)}{S_L(i)}.$$

Specifically, an initial normalized power amount of the resource pool (that is, a capacity of the resource pool) is a sum of the preset normalized power of the plurality of cells in the N periods. For example, the initial normalized power amount of the resource pool may satisfy the following Formula 3:

$$\text{Initial normalized power amount} = \sum_i \frac{P_{config}(i)*G(i)}{S_L(i)} *N, \quad \text{Formula 3}$$

where $$\frac{P_{config}(i)*G(i)}{S_L(i)}$$

is the preset normalized power of the cell i.

It should be noted that the network device may simultaneously assign the sum of the preset normalized power of the plurality of cells in the N periods into the resource pool, or may dynamically assign the sum of the preset normalized power of the plurality of cells into the resource pool in real time for a plurality of times. This is not limited in this application.

Figure 4:
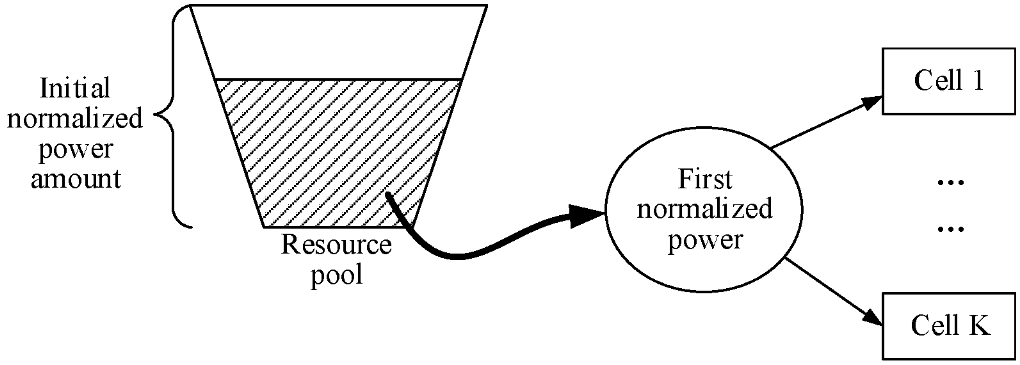
FIG. 4 is a schematic diagram of a resource pool according to this application.

For example, the capacity of the resource pool shown in FIG. 4 is the foregoing initial normalized power amount. The first normalized power at a start moment of the $n^{th}$ period in the N periods is the remaining normalized power of the resource pool in the (n−1)th period. Then, how to allocate power to the plurality of cells (K cells are used as an example for description) in the $n^{th}$ period is determined based on the first normalized power.

In an optional implementation, a method for the network device to determine the first normalized power at the start moment of the $n^{th}$ period may be: the network device subtracts, from the initial normalized power amount, the products of the plurality of cells, to obtain a difference, where each of the products is obtained by multiplying a sum of actual transmit power of each cell in first n−1 periods by a first coefficient of each cell. The network device determines that the obtained difference is the first normalized power. For an explanation of the first coefficient, refer to the foregoing related descriptions of the first coefficient.

It should be noted that an actual transmit power of each cell in a period is not necessarily equal to the power allocated to each cell in the period, and the actual transmit power of each cell may be less than the allocated power. Optionally, the network device may obtain the actual transmit power of each cell in a period reported by the cell.

Optionally, a total duration of the N periods may be 6 minutes or the like.

Step 202: The network device determines a total normalized power expected to be used by the plurality of cells in the $n^{th}$ period. The plurality of cells work on different bands, in other words, the plurality of cells are co-coverage cells that are on a plurality of bands and that are of the network device.

In an optional implementation, a method for the network device to determine the total normalized power expected to be used by the plurality of cells in the $n^{th}$ period may be: the network device multiplies a preset maximum power of each cell of the $n^{th}$ period by the first coefficient to obtain a normalized power expected to be used by each cell in the $n^{th}$ period. The network device determines that a sum of normalized power expected to be used by all cells in the $n^{th}$ period is the total normalized power.

In this way, when determining how to allocate power to the plurality of cells of the $n^{th}$ period based on the first normalized power shown in FIG. 4, the network device specifically determines, with reference to a value relationship between the first normalized power and the total normalized power, how to allocate power to the plurality of cells of the $n^{th}$ period.

Specifically, the network device determines the value relationship between the total normalized power and the first normalized power. When the total normalized power is less than or equal to the first normalized power, the network device allocates power to each cell based on a service requirement of each cell in the plurality of cells of the $n^{th}$ period. In this case, in the $n^{th}$ period, the power that is required to satisfy the service requirement of each cell may be allocated to each cell. When the total normalized power is greater than the first normalized power, the network device performs the following step 203.

Step 203: When the total normalized power is greater than the first normalized power, the network device allocates power to each cell based on the preset normalized power of each cell and the first normalized power.

In an optional implementation, a method for the network device to allocate the power to each cell based on the preset normalized power of each cell and the first normalized power may be: the network device divides the preset normalized power of each cell by a sum of preset normalized power of all the cells, to obtain a power proportion of each cell. Then, the network device multiplies the first normalized power, the power proportion of each cell, and a reciprocal of the first coefficient, to obtain the power allocated to each cell.

For example, a power proportion of the cell i is $$\frac{\frac{P_{config}(i)*G(i)}{S_L(i)}}{\sum_i \frac{P_{config}(i)*G(i)}{S_L(i)}},$$

and the power allocated to the cell i is First normalized power*Power proportion ratio of the cell $$i*\frac{S_L(i)}{G(i)}.$$

In an optional implementation, to further optimize network performance, the network device may implement the optimization in at least one of the following two manners. Examples are as follows.

Manner 1: The network device determines a load difference between a first cell and a second cell in m periods before the $n^{th}$ period. When the load difference is greater than or equal to a load difference threshold, and a load of the first cell is greater than a load of the second cell, the network device hands over, in the $n^{th}$ period, at least one to-be-scheduled terminal device in the first cell to the second cell. The m periods include an $(n-1)^{th}$ period, and m is an integer greater than or equal to 1.

Optionally, when m is greater than or equal to 2, the load difference between the first cell and the second cell in the m periods may be a difference between weighted averages of the loads of the first cell and the second cell in the m periods. It should be understood that the foregoing is merely an example, the load difference may be a difference determined by using another method. This is not limited in this application.

Optionally, when m is equal to 1, in other words, the m period is the $(n-1)^{th}$ period, the load difference between the first cell and the second cell in the m period is the load difference between the first cell and the second cell in the $(n-1)^{th}$ period.

Manner 2: The network device determines a normalized power utilization difference between the first cell and the second cell in the m periods before the $n^{th}$ period. When the normalized power utilization difference is greater than or equal to a normalized power utilization difference threshold, and the normalized power utilization of the first cell is greater than the normalized power utilization of the second cell, the network device hands over, in the $n^{th}$ period, at least one to-be-scheduled terminal device in the first cell to the second cell. The normalized power utilization of the first cell is a value obtained by dividing a product of the actual transmit power of the first cell in the m periods and a first coefficient of the first cell by the initial normalized power amount, and the normalized power utilization of the second cell is a value obtained by dividing a product of the actual transmit power of the second cell in the m periods and a first coefficient of the second cell by the initial normalized power amount.

Optionally, when m is greater than or equal to 2, the normalized power utilization difference between the first cell and the second cell in the m periods may be a difference between weighted averages of the normalized power utilization of the first cell and the second cell in the m periods. It should be understood that the foregoing is merely an example, and the normalized power utilization difference may be a difference determined by using another method. This is not limited in this application.

Optionally, when m is equal to 1, in other words, the m period is the $(n-1)^{th}$ period, the normalized power utilization difference between the first cell and the second cell in the m periods is the normalized power utilization difference between the first cell and the second cell in the $(n-1)^{th}$ period.

Figure 5:
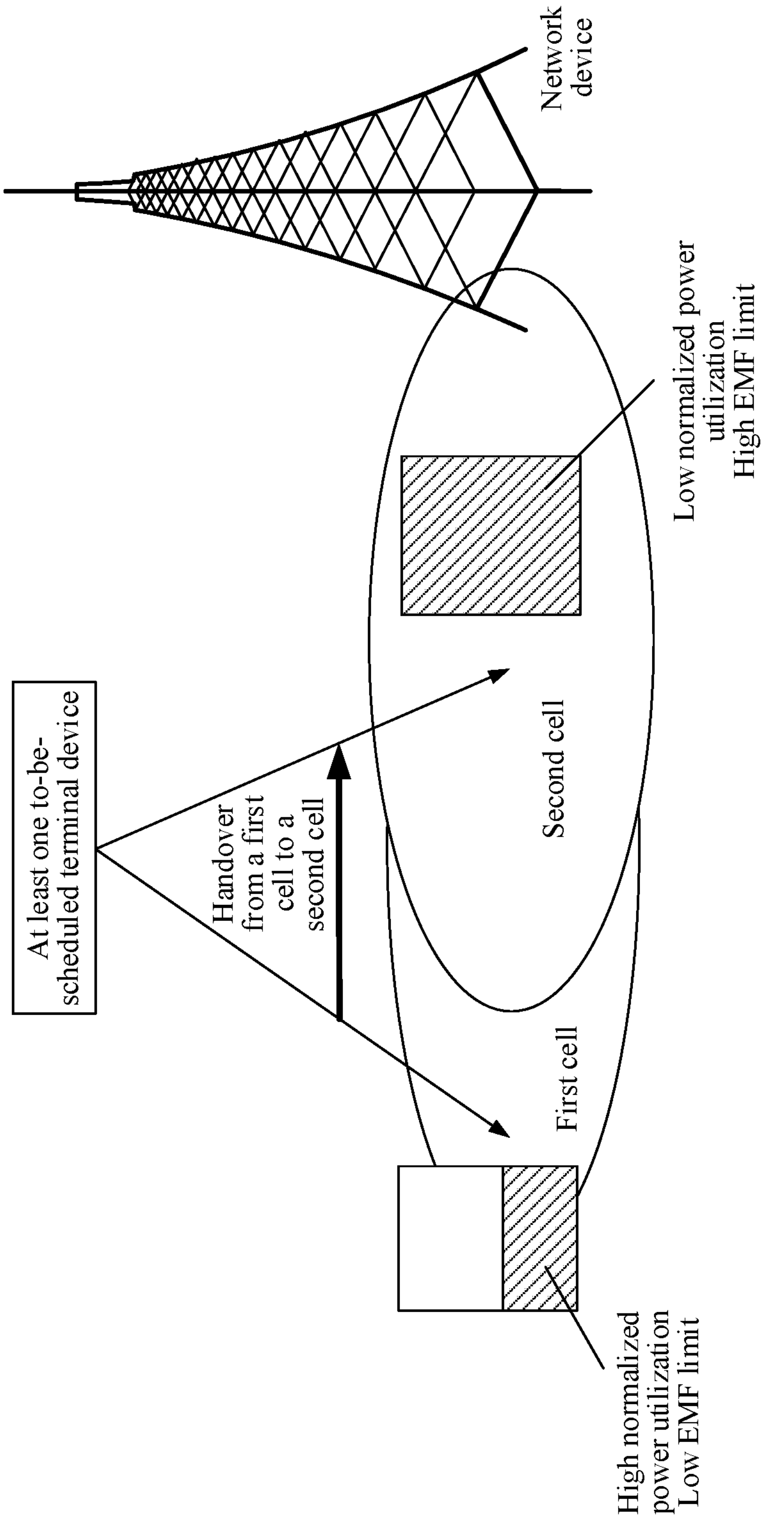
FIG. 5 is a schematic diagram of performing handover based on a normalized power utilization according to this application.

For example, when the normalized power utilization of a cell is high, an EMF limit corresponding to the cell is low. Conversely, when the normalized power utilization of a cell is low, an EMF limit corresponding to the cell is high. In other words, when the normalized power utilization of the first cell is greater than the normalized power utilization of the second cell, an EMF limit of the first cell is less than an EMF limit of the second cell. In this case, at least one to-be-scheduled terminal device in the cell with the low EMF limit is handed over to the cell with the high EMF limit. For example, FIG. 5 is a schematic diagram of performing handover based on normalized power utilization.

It should be noted that the foregoing load difference threshold and the normalized power utilization difference threshold may be determined in a manner such as an optimization algorithm or artificial intelligence (AI) training. Details are not described in this application. In this application, the load difference threshold and the normalized power utilization difference threshold may be determined in advance by default, and may be directly used.

Optionally, an operation performed by the network device in the foregoing method may be completed by a layer-2 module such as a baseband unit (BBU). This is not limited in this application.

According to the communication method provided in embodiments of this application, an original power allocation constraint can be broken, power sharing between cells on a plurality of bands can be implemented, and cell network performance can be improved while an EMF regulatory requirement of the network device can still be satisfied.

Figure 6:
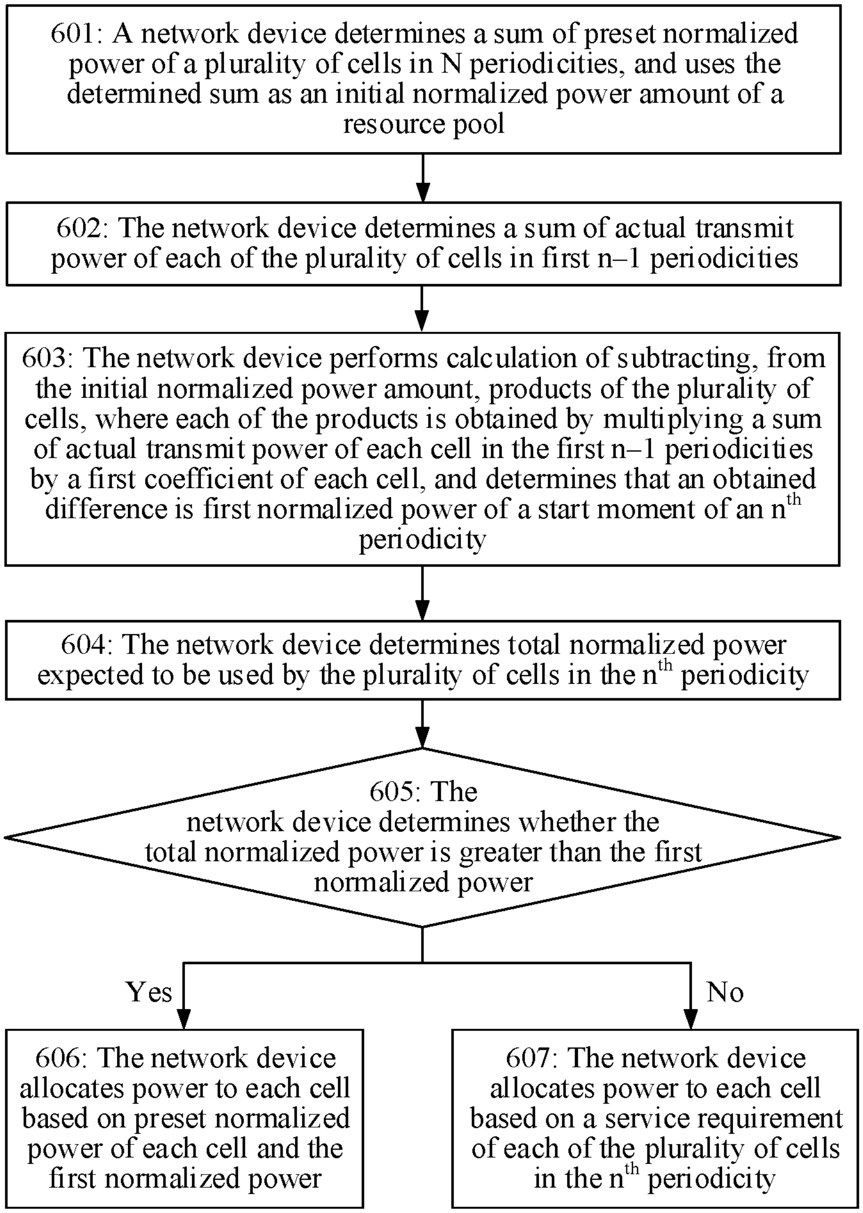
FIG. 6 is a flowchart of an example of a communication method according to this application.

Based on the foregoing embodiments, an embodiment of this application provides an example of a communication method. As shown in FIG. 6, a specific procedure of the example may include the following steps.

Step 601: A network device determines a sum of preset normalized power of a plurality of cells in N periods, and uses the determined sum as an initial normalized power amount of a resource pool (that is, a capacity of the resource pool).

Specifically, for the initial normalized power amount of the resource pool, refer to Formula 3 in the embodiment shown in FIG. 2.

It may be understood that the initial normalized power amount of the resource pool is a first normalized power at a start moment of a first period.

Step 602: The network device determines a sum of the actual transmit power of each of the plurality of cells in first n−1 periods.

Step 603: The network device performs calculation of subtracting, from the initial normalized power amount, products of the plurality of cells to obtain a difference, where each of the products is obtained by multiplying a sum of the actual transmit power of each cell in the first n−1 periods by a first coefficient of each cell, and determines that the obtained difference is a first normalized power of a start moment of an $n^{th}$ period.

In other words, the remaining normalized power of the resource pool in an $(n-1)^{th}$ period may be determined in step 603.

Step 604: The network device determines a total normalized power expected to be used by the plurality of cells in the $n^{th}$ period.

Specifically, for an example method for implementing step 604, refer to the descriptions in step 202.

Step 605: The network device determines whether the total normalized power is greater than the first normalized power. If yes, step 606 is performed. If not, step 607 is performed.

Step 606: The network device allocates power to each cell based on the preset normalized power of each cell and the first normalized power.

Specifically, the network device divides the preset normalized power of each cell by a sum of the preset normalized power of all the cells, to obtain a power proportion of each cell. Then, the network device multiplies the first normalized power, the power proportion of each cell, and a reciprocal of the first coefficient, to obtain the power allocated to each cell. For detailed descriptions, refer to related descriptions in step 203. Details are not described herein again.

Step 607: The network device allocates power to each cell based on a service requirement of each of the plurality of cells in the $n^{th}$ period.

According to the foregoing example, power sharing between the plurality of cells can be implemented, and an EMF regulatory requirement of the network device can be satisfied.

Figure 7:
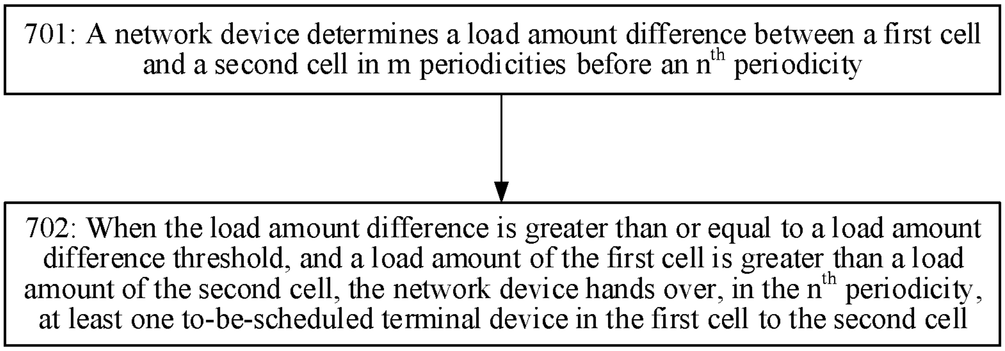
FIG. 7 is a flowchart of another communication method according to this application.

Based on the foregoing embodiments, to improve network performance, an embodiment of this application further provides a communication method. Refer to FIG. 7. A specific procedure of the method may include the following steps.

Step 701: A network device determines a load difference between a first cell and a second cell in m periods before an $n^{th}$ period, where the m periods include an $(n-1)^{th}$ period, and m is an integer greater than or equal to 1.

The $n^{th}$ period is one of the N periods. For detailed descriptions, refer to related descriptions of the N periods in the embodiment shown in FIG. 2.

Optionally, when m is greater than or equal to 2, the load difference between the first cell and the second cell in the m periods may be a difference between weighted averages of the loads of the first cell and the second cell in the m periods. It should be understood that the foregoing is merely an example, the load difference may be a difference determined by using another method. This is not limited in this application.

Optionally, when m is equal to 1, in other words, the m period is the $(n-1)^{th}$ period, the load difference between the first cell and the second cell in the m period is the load difference between the first cell and the second cell in the $(n-1)^{th}$ period.

Step 702: When the load difference is greater than or equal to a load difference threshold, and a load of the first cell is greater than a load of the second cell, the network device hands over, in the $n^{th}$ period, at least one to-be-scheduled terminal device in the first cell to the second cell.

For descriptions of the load difference, refer to related descriptions in the embodiment shown in FIG. 2. Details are not described herein again.

By using the foregoing method, network performance can be improved through cell handover.

Figure 8:
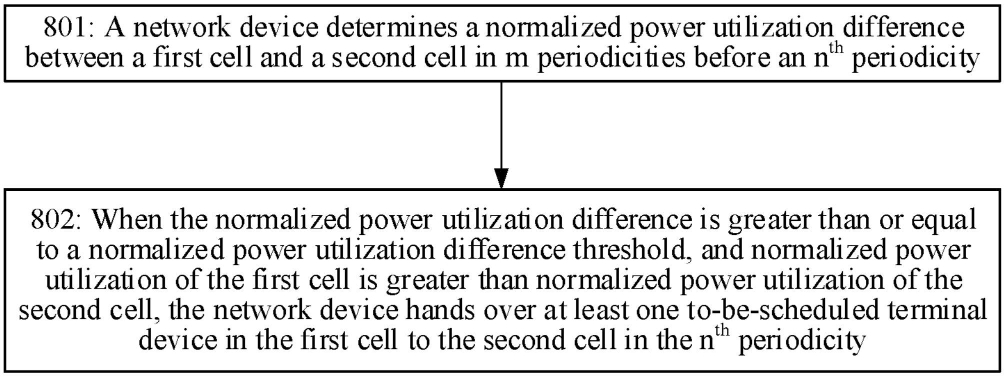
FIG. 8 is a flowchart of another communication method according to this application.

Based on the foregoing embodiments, to improve network performance, an embodiment of this application further provides another communication method. Refer to FIG. 8. A specific procedure of the method may include the following steps.

Step 801: A network device determines a normalized power utilization difference between a first cell and a second cell in m periods before an $n^{th}$ period.

For related descriptions of m and n, refer to related descriptions in step 701 in the embodiment shown in FIG. 7. Details are not described herein again.

Step 802: When the normalized power utilization difference is greater than or equal to a normalized power utilization difference threshold, and the normalized power utilization of the first cell is greater than the normalized power utilization of the second cell, the network device hands over at least one to-be-scheduled terminal device in the first cell to the second cell in the $n^{th}$ period.

The normalized power utilization of the first cell is a value obtained by dividing a product of the actual transmit power of the first cell in the m periods and a first coefficient of the first cell by an initial normalized power amount, and the normalized power utilization of the second cell is a value obtained by dividing a product of the actual transmit power of the second cell in the m periods and a first coefficient of the second cell by the initial normalized power amount.

Specifically, for detailed descriptions of step 802, refer to related descriptions in the embodiment shown in FIG. 2. Details are not described herein again.

For descriptions of the normalized power utilization difference threshold, refer to related descriptions in the embodiment shown in FIG. 2. Details are not described herein again.

By using the foregoing method, network performance can be improved through cell handover.

It should be noted that, the embodiments shown in FIG. 7 and FIG. 8 may alternatively be combined, to jointly improve network performance by using the foregoing two methods.

Figure 9:
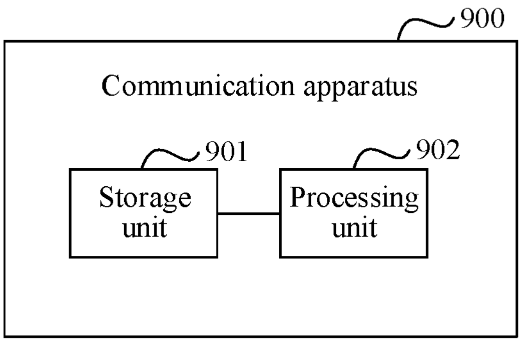
FIG. 9 is a schematic structural diagram of a communication apparatus according to this application.

Based on the foregoing embodiments, an embodiment of this application further provides a communication apparatus. Refer to FIG. 9. The communication apparatus 900 may include a storage unit 901 (e.g., a storage medium or storage device) and a processing unit 902 (e.g., a central processing unit or a chip). The storage unit 901 is configured to store computer instructions and the like in the communication apparatus 900, and the processing unit 902 is configured to control and manage an action of the communication apparatus 900.

For example, the communication apparatus 900 may specifically be the network device, or a processor, a chip, a chip system, a functional module, or the like in the network device in the foregoing embodiments.

Specifically, when the communication apparatus 900 is configured to implement a function of the network device in the foregoing embodiments, the communication apparatus 900 may include the following.

The storage unit 901 is configured to store the computer instructions. The processing unit 902 is configured to invoke the computer instructions in the storage unit to: determine first normalized power at a start moment of an $n^{th}$ period in N periods, where N is an integer greater than or equal to 1, n is an integer greater than or equal to and less than or equal to N. The processing unit 902 is configured to invoke the computer instructions in the storage unit to further determine the total normalized power expected to be used by a plurality of cells in the $n^{th}$ period, and when the total normalized power is greater than the first normalized power, to allocate power to each cell based on preset normalized power of each cell in the plurality of cells and the first normalized power, where the preset normalized power is used for the power allocation.

For example, the preset normalized power of each cell in the plurality of cells satisfies the following formula:

$$\text{Preset normalized power of a cell } i = \frac{P_{config}(i) * G(i)}{S_L(i)}.$$

Here i is an index of any one of the plurality of cells, and i is an integer greater than or equal to 1; $P_{config}(i)$ is an average power threshold that is of the cell i and that is configured for meeting a total power density requirement of a co-coverage cell; G(i) is an antenna gain of the cell i; and $S_L(i)$ is a power density threshold of the cell i.

In an optional implementation, when determining the first normalized power at the start moment of the $n^{th}$ period, the processing unit 902 is configured to: subtract from an initial normalized power amount, products of the plurality of cells to obtain a difference, where each of the products is obtained by multiplying a sum of actual transmit power of each cell in first n−1 periods by a first coefficient of each cell, where the initial normalized power amount is a sum of preset normalized power of the plurality of cells in the N periods, and the first coefficient of each cell is a ratio of an antenna gain of each cell to a power density threshold of each cell; and determine that an obtained difference is the first normalized power.

For example, the initial normalized power amount satisfies the following formula:

$$\text{Initial normalized power amount} = \sum_i \frac{P_{config}(i) * G(i)}{S_L(i)} * N.$$

Here i is the index of any one of the plurality of cells, and i is an integer greater than or equal to 1; $P_{config}(i)$ is the average power threshold that is of the cell i and that is configured for meeting the total power density requirement of the co-coverage cell; G(i) is the antenna gain of the cell i; and $S_L(i)$ is the power density threshold of the cell i.

In an optional implementation, when determining the total normalized power expected to be used by the plurality of cells in the $n^{th}$ period, the processing unit 902 is configured to: multiply a preset maximum power of each cell of the $n^{th}$ period by the first coefficient to obtain a normalized power expected to be used by each cell in the $n^{th}$ period, and determine that a sum of normalized power expected to be used by all cells in the $n^{th}$ period is the total normalized power, where the first coefficient is the ratio of the antenna gain of each cell to the power density threshold of each cell.

Optionally, when allocating the power to each cell based on the preset normalized power of each cell in the plurality of cells and the total normalized power, the processing unit 902 is configured to: divide the preset normalized power of each cell by a sum of preset normalized power of all the cells, to obtain a power proportion of each cell, and multiply the first normalized power, the power proportion of each cell, and a reciprocal of the first coefficient, to obtain the power allocated to each cell, where the first coefficient is the ratio of the antenna gain of each cell to the power density threshold of each cell.

In an example, the processing unit 902 is further configured to: determine a load difference between a first cell and a second cell in m periods before the $n^{th}$ period, where the m periods include an $(n-1)^{th}$ period, and m is an integer greater than or equal to 1, and when the load difference is greater than or equal to a load difference threshold and a load of the first cell is greater than a load of the second cell, hand over at least one to-be-scheduled terminal device in the first cell to the second cell in the $n^{th}$ period.

In another example, the processing unit 902 is further configured to: determine a normalized power utilization difference between the first cell and the second cell in the m periods before the $n^{th}$ period, where the m periods include an $(n-1)^{th}$ period, and m is an integer greater than or equal to 1, and when the normalized power utilization difference is greater than or equal to a normalized power utilization difference threshold and the normalized power utilization of the first cell is greater than the normalized power utilization of the second cell, hand over at least one to-be-scheduled terminal device in the first cell to the second cell in the $n^{th}$ period. The normalized power utilization of the first cell is a value obtained by dividing a product of the actual transmit power of the first cell in the m periods and a first coefficient of the first cell by the initial normalized power amount, and the normalized power utilization of the second cell is a value obtained by dividing a product of the actual transmit power of the second cell in the m periods and a first coefficient of the second cell by the initial normalized power amount. The initial normalized power amount is the sum of the preset normalized power of the plurality of cells in the N periods. The first coefficient of the first cell is a ratio of an antenna gain of the first cell to a power density threshold of the first cell, and the first coefficient of the second cell is a ratio of an antenna gain of the second cell to a power density threshold of the second cell.

It should be noted that, in embodiments of this application, the particular division of an apparatus into units is merely an example, and may be –a logical function division. During an actual implementation, a different division manner may be used. Functional units in embodiments of this application may be integrated into one processing unit, or each of the units may be standalone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the method described in embodiments of this application. The foregoing storage medium includes any medium that can store program code, such as a USB flash drive, a removable hard disk, a read-only memory (ROM), a random access memory (RAM), a magnetic disk, or an optical disc.

Figure 10:
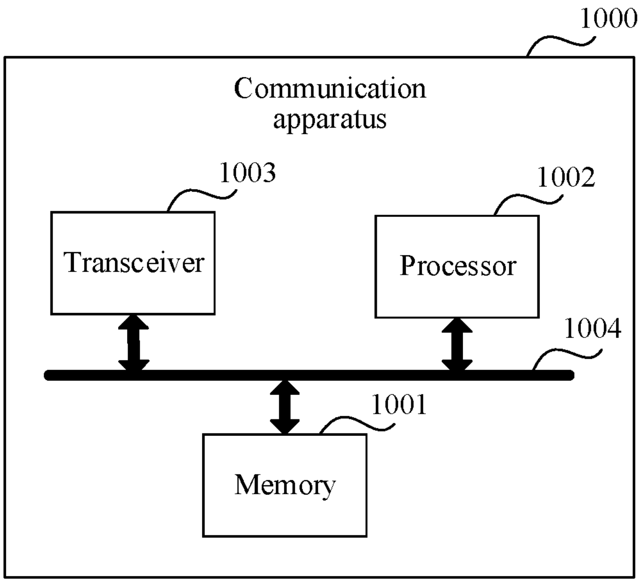
FIG. 10 is a structural diagram of a communication apparatus according to this application.

Based on the foregoing embodiments, an embodiment of this application further provides a communication apparatus. Refer to FIG. 10. The communication apparatus 1000 may include a memory 1001 and a processor 1002. Optionally, the communication apparatus 1000 may further include a transceiver 1003. The processor 1002 may control the transceiver 1003 to receive and send information, a signal, data, or the like.

Specifically, the processor 1002 may be a central processing unit (CPU), a network processor (NP), or a combination of the CPU and the NP. The processor 1002 may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), generic array logic (GAL), or any combination thereof.

The memory 1001, the processor 1002, and the transceiver 1003 are connected to each other. Optionally, the memory 1001, the processor 1002, and the transceiver 1003 are interconnected through a bus 1004. The bus 1004 may be a peripheral component interconnect (PCI) bus, an extended industry standard architecture (EISA) bus, or the like. The bus may be classified into an address bus, a data bus, a control bus, and the like. For ease of representation, only one bold line is used for representation in FIG. 10, but this does not mean that there is only one bus or only one type of bus.

In an optional implementation, the memory 1001 is configured to store a program and the like. Specifically, the program may include program code, and the program code includes computer operating instructions. The memory 1001 may include a RAM, and may further include a non-volatile memory, for example, one or more disk memories. The processor 1002 executes the application program stored in the memory 1001, to implement the foregoing functions, so that a function of the communication apparatus 1000 is implemented.

For example, the communication apparatus 1000 may be the network device in the foregoing embodiments.

Specifically, when the communication apparatus 1000 implements a function of the network device in the foregoing embodiments, the memory 1001 may be configured to store the computer instructions. The processor 1002 may implement an operation performed by the network device in the foregoing embodiments. For specific related descriptions, refer to related descriptions in the embodiments shown in FIG. 2 and FIG. 6 to FIG. 8. Details are not described herein again.

Based on the foregoing embodiments, an embodiment of this application provides a communication system. The communication system may include the network device and the like in the foregoing embodiments.

An embodiment of this application further provides a computer-readable storage medium. The computer-readable storage medium is configured to store a computer program. When the computer program is executed by a computer, the computer may implement a communication method provided in the foregoing method embodiments.

An embodiment of this application further provides a computer program product. The computer program product is configured to store a computer program. When the computer program is executed by a computer, the computer may implement a communication method provided in the foregoing method embodiments.

An embodiment of this application further provides a chip system. The chip system includes at least one processor and a communication interface. The communication interface is configured to send and/or receive a signal. The at least one processor is configured to invoke a computer program stored in at least one memory, so that the chip system can implement a communication method provided in the foregoing method embodiments.

An embodiment of this application further provides a chip, including a processor. The processor is coupled to a memory, and is configured to invoke a program in the memory, so that the chip can implement a communication method provided in the foregoing method embodiments.

An embodiment of this application further provides a chip. The chip is coupled to a memory, and the chip is configured to implement a communication method provided in the foregoing method embodiments.

A person skilled in the art should understand that embodiments of this application may be provided as methods, systems, or computer program products. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the methods, the devices (systems), and the computer program products according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can lead the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the other programmable device, to generate computer-implemented processing. Therefore, the instructions executed on the computer or the other programmable device provide steps for implementing a specific function in one or more procedures in the flowcharts and/or in one or more blocks in the block diagrams.

It is clear that, a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A communication method, performed by a network device, comprising:

determining a first normalized power at a start moment of an $n^{th}$ period in N periods, wherein N is an integer greater than or equal to 1, and n is an integer greater than or equal to 1 and less than or equal to N; wherein the determining of the first normalized power at the start moment of the $n^{th}$ period comprises:

subtracting from an initial normalized power amount, products of the plurality of cells to obtain a difference, wherein each of the products is obtained by multiplying a sum of actual transmit power of each cell in first n−1 periods by a first coefficient of each cell, wherein the initial normalized power amount is a sum of preset normalized power of the plurality of cells in the N periods, and the first coefficient of each cell is a ratio of an antenna gain of each cell to a power density threshold of the each cell; and determining, that the obtained difference is the first normalized power;

determining a total normalized power expected to be used by a plurality of cells in the $n^{th}$ period; and when the total normalized power is greater than the first normalized power, allocating, power to each cell based on a preset normalized power of each cell in the plurality of cells and the first normalized power.

2. The method according to claim 1, wherein the preset normalized power of each cell in the plurality of cells satisfies the following formula:

$$\text{Preset normalized power of a cell } i = \frac{P_{config}(i) * G(i)}{S_L(i)},$$

wherein i is an index of any one of the plurality of cells, and i is an integer greater than or equal to 1; $P_{config}(i)$ is an average power threshold that is of the cell i and that is configured for meeting a total power density requirement of a co-coverage cell; G(i) is an antenna gain of the cell i; and $S_L(i)$ is a power density threshold of the cell i.

3. The method according to claim 1, wherein the initial normalized power amount satisfies the following formula:

$$\text{Initial normalized power amount} = \sum_i \frac{P_{config}(i) * G(i)}{S_L(i)} * N$$

wherein i is the index of any one of the plurality of cells, and i is the integer greater than or equal to 1; $P_{config}(i)$ is the average power threshold that is of the cell i and that is configured for meeting the total power density requirement of the co-coverage cell; G(i) is the antenna gain of the cell i; and $S_L(i)$ is the power density threshold of the cell i.

4. The method according to claim 1, wherein the determining of the total normalized power expected to be used by a plurality of cells in the $n^{th}$ period comprises:

multiplying a preset maximum power of each cell in the $n^{th}$ period by a first coefficient to obtain normalized power expected to be used by each cell in the $n^{th}$ period, wherein the first coefficient is the ratio of the antenna gain of each cell to the power density threshold of each cell; and determining that a sum of normalized power expected to be used by all cells in the $n^{th}$ period is the total normalized power.

5. The method according to claim 1, wherein the allocating of the power to each cell based on the preset normalized power of each cell in the plurality of cells and the first normalized power comprises:

dividing the preset normalized power of each cell by a sum of preset normalized power of all the cells to obtain a power proportion of each cell; and multiplying the first normalized power, the power proportion of each cell, and a reciprocal of a first coefficient to obtain the power allocated to each cell, wherein the first coefficient is the ratio of the antenna gain of each cell to the power density threshold of each cell.

6. The method according to claim 1, wherein the method further comprises:

determining a load difference between a first cell and a second cell in m periods before the $n^{th}$ period, wherein the m periods comprise an $(n-1)^{th}$ period, and m is an integer greater than or equal to 1; and when the load difference is greater than or equal to a load difference threshold, and a load of the first cell is greater than a load of the second cell, handing over at least one to-be-scheduled terminal device in the first cell to the second cell in the $n^{th}$ period.

7. The method according to claim 1, wherein the method further comprises:

determining a normalized power utilization difference between the first cell and the second cell in the m periods before the $n^{th}$ period, wherein the m periods comprise an $(n-1)^{th}$ period, and m is an integer greater than or equal to 1; and when the normalized power utilization difference is greater than or equal to a normalized power utilization difference threshold, and normalized power utilization of the first cell is greater than normalized power utilization of the second cell, handing over at least one to-be-scheduled terminal device in the first cell to the second cell in the $n^{th}$ period, wherein the normalized power utilization of the first cell is a value obtained by dividing a product of an actual transmit power of the first cell in the m periods and a first coefficient of the first cell by the initial normalized power amount, the normalized power utilization of the second cell is a value obtained by dividing a product of an actual transmit power of the second cell in the m periods and a first coefficient of the second cell by the initial normalized power amount, the initial normalized power amount is a sum of a preset normalized power of the plurality of cells in the N periods, the first coefficient of the first cell is a ratio of an antenna gain of the first cell to a power density threshold of the first cell, and the first coefficient of the second cell is a ratio of an antenna gain of the second cell to a power density threshold of the second cell.

8. A communication apparatus, comprising:

a processor; and a computer-readable storage medium storing a program to be executed by the processor, the program including instructions that cause the processor to:

determine a first normalized power at a start moment of an $n^{th}$ period in N periods, wherein N is an integer greater than or equal to 1, and n is an integer greater than or equal to 1 and less than or equal to N, wherein the first normalized power is determined at the start moment of the $n^{th}$ period by causing the processor to:

subtract from an initial normalized power amount, products of the plurality of cells to obtain a difference, wherein each of the products is obtained by multiplying a sum of actual transmit power of each cell in first n−1 periods by a first coefficient of each cell, wherein the initial normalized power amount is a sum of preset normalized power of the plurality of cells in the N periods, and the first coefficient of each cell is a ratio of an antenna gain of each cell to a power density threshold of each cell; and determine, that the obtained difference is the first normalized power, determine a total normalized power expected to be used by a plurality of cells in the $n^{th}$ period; and when the total normalized power is greater than the first normalized power, allocate power to each cell based on a preset normalized power of each cell in the plurality of cells and the first normalized power.

9. The apparatus according to claim 8, wherein the preset normalized power of each cell in the plurality of cells satisfies the following formula:

$$\text{Preset normalized power of a cell } i = \frac{P_{config}(i) * G(i)}{S_L(i)},$$

wherein i is an index of any one of the plurality of cells, and i is an integer greater than or equal to 1; $P_{config}(i)$ is an average power threshold that is of the cell i and that is configured for meeting a total power density requirement of a co-coverage cell; G(i) is an antenna gain of the cell i; and $S_L(i)$ is a power density threshold of the cell i.

10. The apparatus according to claim 8, wherein the initial normalized power amount satisfies the following formula:

$$\text{Initial normalized power amount} = \sum_i \frac{P_{config}(i) * G(i)}{S_L(i)} * N$$

wherein i is the index of any one of the plurality of cells, and i is the integer greater than or equal to 1; $P_{config}(i)$ is the average power threshold that is of the cell i and that is configured for meeting the total power density requirement of the co-coverage cell; G(i) is the antenna gain of the cell i; and $S_L(i)$ is the power density threshold of the cell i.

11. The apparatus according to claim 8, the program including instructions that cause the processor to:

multiply a preset maximum power of each cell in the $n^{th}$ period by the first coefficient to obtain a normalized power expected to be used by each cell in the $n^{th}$ period, wherein the first coefficient is the ratio of the antenna gain of each cell to the power density threshold of each cell; and determine that a sum of normalized power expected to be used by all cells in the $n^{th}$ period is the total normalized power.

12. The apparatus according to claim 8, the program including instructions to:

divide the preset normalized power of each cell by a sum of the preset normalized power of all the cells, to obtain a power proportion of each cell; and multiply the first normalized power, the power proportion of each cell, and a reciprocal of the first coefficient, to obtain a power allocated to each cell, wherein the first coefficient is the ratio of the antenna gain of each cell to the power density threshold of each cell.

13. The apparatus according to claim 8, the program including instructions to:

determine a load difference between the first cell and the second cell in m periods before the $n^{th}$ period, wherein the m periods comprise an $(n-1)^{th}$ period, and m is an integer greater than or equal to 1; and when the load difference is greater than or equal to a load difference threshold, and a load of the first cell is greater than a load of the second cell, hand over at least one to-be-scheduled terminal device in the first cell to the second cell in the $n^{th}$ period.

14. The apparatus according to claim 8, the program including instructions to:

determine a normalized power utilization difference between the first cell and the second cell in the m periods before the $n^{th}$ period, wherein the m periods comprise an $(n-1)^{th}$ period, and m is an integer greater than or equal to 1; and when the normalized power utilization difference is greater than or equal to a normalized power utilization difference threshold, and normalized power utilization of the first cell is greater than normalized power utilization of the second cell, hand over at least one to-be-scheduled terminal device in the first cell to the second cell in the $n^{th}$ period, wherein the normalized power utilization of the first cell is a value obtained by dividing a product of an actual transmit power of the first cell in the m periods and a first coefficient of the first cell by the initial normalized power amount, the normalized power utilization of the second cell is a value obtained by dividing a product of an actual transmit power of the second cell in the m periods and a first coefficient of the second cell by the initial normalized power amount, the initial normalized power amount is a sum of a preset normalized power of the plurality of cells in the N periods, the first coefficient of the first cell is a ratio of an antenna gain of the first cell to a power density threshold of the first cell, and the first coefficient of the second cell is a ratio of an antenna gain of the second cell to a power density threshold of the second cell.

15. A chip, comprising a processor and a memory coupled to the processor, wherein the processor is configured to execute program instructions stored in the memory to perform a communication method, the method comprising:

determining a first normalized power at a start moment of an $n^{th}$ period in N periods, wherein N is an integer greater than or equal to 1, and n is an integer greater than or equal to 1 and less than or equal to N; wherein the determining of the first normalized power at the start moment of the $n^{th}$ period comprises:

subtracting from an initial normalized power amount, products of the plurality of cells to obtain a difference, wherein each of the products is obtained by multiplying a sum of actual transmit power of each cell in first n−1 periods by a first coefficient of each cell, wherein the initial normalized power amount is a sum of preset normalized power of the plurality of cells in the N periods, and the first coefficient of each cell is a ratio of an antenna gain of each cell to a power density threshold of the each cell; and determining, that the obtained difference is the first normalized power;

determining a total normalized power expected to be used by a plurality of cells in the $n^{th}$ period; and when the total normalized power is greater than the first normalized power, allocating, power to each cell based on a preset normalized power of each cell in the plurality of cells and the first normalized power.

16. The chip according to claim 15, wherein the preset normalized power of each cell in the plurality of cells satisfies the following formula:

$$\text{Preset normalized power of a cell } i = \frac{P_{config}(i) * G(i)}{S_L(i)},$$

wherein i is an index of any one of the plurality of cells, and i is an integer greater than or equal to 1; $P_{config}(i)$ is an average power threshold that is of the cell i and that is configured for meeting a total power density requirement of a co-coverage cell; G(i) is an antenna gain of the cell i; and $S_L(i)$ is a power density threshold of the cell i.

17. The chip according to claim 15, wherein the initial normalized power amount satisfies the following formula:

$$\text{Initial normalized power amount} = \sum_i \frac{P_{config}(i) * G(i)}{S_L(i)} * N$$

wherein i is the index of any one of the plurality of cells, and i is the integer greater than or equal to 1; $P_{config}(i)$ is the average power threshold that is of the cell i and that is configured for meeting the total power density requirement of the co-coverage cell; G(i) is the antenna gain of the cell i; and $S_L(i)$ is the power density threshold of the cell i.

18. The chip according to claim 15, wherein the determining of the total normalized power expected to be used by a plurality of cells in the $n^{th}$ period comprises:

multiplying a preset maximum power of each cell in the $n^{th}$ period by a first coefficient to obtain normalized power expected to be used by each cell in the $n^{th}$ period, wherein the first coefficient is the ratio of the antenna gain of each cell to the power density threshold of each cell; and determining that a sum of normalized power expected to be used by all cells in the $n^{th}$ period is the total normalized power.

19. The chip according to claim 15, wherein the allocating of the power to each cell based on the preset normalized power of each cell in the plurality of cells and the first normalized power comprises:

dividing the preset normalized power of each cell by a sum of preset normalized power of all the cells to obtain a power proportion of each cell; and multiplying the first normalized power, the power proportion of each cell, and a reciprocal of a first coefficient to obtain the power allocated to each cell, wherein the first coefficient is the ratio of the antenna gain of each cell to the power density threshold of each cell.

20. The chip according to claim 15, wherein the method further comprises:

determining a load difference between a first cell and a second cell in m periods before the $n^{th}$ period, wherein the m periods comprise an $(n-1)^{th}$ period, and m is an integer greater than or equal to 1; and when the load difference is greater than or equal to a load difference threshold, and a load of the first cell is greater than a load of the second cell, handing over at least one to-be-scheduled terminal device in the first cell to the second cell in the $n^{th}$ period.

* * * * *